United States Patent [19]
Jutamulia et al.

[11] Patent Number: 5,182,639
[45] Date of Patent: Jan. 26, 1993

[54] REAL-TIME ANALYTIC PSEUDOCOLOR ENCODER SYSTEM

[76] Inventors: Suganda Jutamulia, 38730 Lexington St., Apt. 274, Fremont, Calif. 94536; Akihiro Fujita, 10240 Parkwood Dr., #3, Cupertino, Calif. 95014; Shinji Toyoda, 10224 Parkwood Dr., #3, Cupertino, Calif. 95014; Atsushi Kojima, Pal Yanokuchi 202, 451-1 Yanokuchi 202 Inagi-city Tokyo, Japan; Eiichi Ito, 81, Kaji-machi, Toyohashi-city Aichi-pref, Japan

[21] Appl. No.: 785,509
[22] Filed: Oct. 30, 1991
[51] Int. Cl.$^5$ .................................. H04N 9/43
[52] U.S. Cl. ............................ 358/81; 358/82
[58] Field of Search ...................... 358/81, 82

[56] References Cited

U.S. PATENT DOCUMENTS

| | | | |
|---|---|---|---|
| 3,647,942 | 3/1972 | Siegel | 358/82 |
| 4,608,596 | 8/1986 | Williams et al. | 358/81 |
| 4,623,245 | 11/1986 | Yu | 358/487 |
| 4,690,150 | 9/1987 | Mayo, Jr. | 358/82 |
| 4,760,537 | 7/1988 | Martin et al. | 382/45 |
| 5,041,911 | 8/1991 | Moorman | 358/82 |
| 5,051,821 | 9/1991 | Vittot | 358/82 |

FOREIGN PATENT DOCUMENTS

| | | |
|---|---|---|
| 3409381 | 9/1984 | European Pat. Off. |
| 57-212892 | 6/1981 | Japan |
| 85100002 | 4/1985 | Japan |
| 61-264888 | 5/1985 | Japan |
| 1568265 | 5/1990 | U.S.S.R. |

OTHER PUBLICATIONS

"Real-Time Pseudocolor Encoding Using a Low-Cost . . . ," by Yu et al., Optics and Laser Techn., vol. 19, No. 1, pp. 45-47 (Feb. 1 1987).
"Gray Level Pseudocolor Encoding Using a Liquid Crystal Television," by Yu et al., J. Optics, vol. 19, No. 3, pp. 129-133 (1988).
"Digital Image Processing with Pseudo-Color," by Radewan et al., pp. 50-56.
"A New Coherent Optical Pseudo-Color Encoder," by Liu et al., Nouv. Rev. Optique, t. 7, No. 5, pp. 285-289 (1976).
"Aus Schwarzweib wird Farbe," Videodigitalisierer und Falschfarbengenerator, Funkschau, 1987.

Primary Examiner—Howard W. Britton
Attorney, Agent, or Firm—Majestic, Parsons, Siebert & Hsue

[57] ABSTRACT

Continuous analytic transform functions implemented optically in U.S. Pat. No. 4,623,245 are instead implemented electronically and in real-time. An improved scheme is disclosed where the range of amplitudes of the monochromatic signal input is divided into n sections and constant, linear or sinusoidal transform functions are utilized in each section for transforming the monochromatic video input to three pseudocolor video signals. Even complex transform functions can be implemented by simple transform functions in each of the sections to reduce the overall complexity of the implementing circuit. The television camera, a pseudocolor encoder and a liquid crystal television monitor are placed within the same housing to form a portable hand-held unit. The weight and size of the unit can be reduced as a result of the simple electronic implementation of the encoder.

20 Claims, 14 Drawing Sheets

REAL-TIME ANALYTIC PSEUDOCOLOR ENCODER SYSTEM

BACKGROUND OF THE INVENTION

This invention relates in general to pseudocolor images and more particularly, to a real-time analytic pseudocolor system and encoder.

Most of the images obtained in various scientific and medical equipment are usually in the form of gray-level images. For example, thermal line scan recorders, laser retina scanners, and multi-format cameras normally produce only gray-level images. Other relatively widely known density images such as scanning electron microscopic images, X-ray transparencies are all gray-level images.

The human visual system can discriminate simultaneously only 15 to 20 gray levels from a complex black and white image. If the same image is presented in full color, the visually distinguishable levels can be increased enormously, up to hundreds or even thousands of different levels [H.-K. Liu and J. W. Goodman, "A New Coherent Optical Pseudocolor Encoder," *Nouv. Rev. Optique*, t.7, No. 5, 1976, 285].

The basic philosophy of pseudocolor is that the eye can perceive many more colors than gray levels and pseudocolor mapping will effectively extend the range of the observer's eye [C. H. Radewan, "Digital Image Processing with Pseudo-Color," Conf. Proc. Acquisition and Analysis of Pictorial Data, *The Modern Science of Imagery*, Aug. 19-20, 1974, Soc. Photo-Optical Instrumentation Engrs. (SPIE), pp. 50-56]. However, this range extension is not only used for observing an already available density image. Surface structure, optical interferant pattern, thermal pattern, etc. can be directly input to the pseudocolor encoder through an appropriate TV camera resulting in a real-time pseudocolor output.

True color information in the input domain is lost when pseudocolor is generated in the output domain. However, under some conditions, true color information is not as important as brightness information. For instance, most animals are color blind. They do not perceive true color information. A pseudocolor encoder picks up the input information as an animal's eye and displays it as a human color perception.

Also, the comparison between two pseudocolor maps is easier than that of density maps. In thermal imaging, if temperature is encoded with gray level, it is very difficult to recognize precisely the temperature of a specific gray level. However, a pseudocolor map may overcome this difficulty. It is much easier to pinpoint a specific color than a specific gray level. The pseudocolor encoder has two primary merits: (1) better discrimination, and (2) better recognition.

Pseudocolor encoding is commonly achieved through two methods: a sophisticated digital method and a relatively simpler optical method. The digital computer technique is a logical choice if the images are already digitized.

In the digital computer technique, the input image is first sampled resulting in the image consisting of finite image elements; for instance, 512×512 elements. The input analog gray level signal at each image element is digitized to certain quantized gray levels; for instance, 64 gray levels. The quantized gray level of the image element is then stored in the memory. The computer has a program, which is usually a lookup table, to assign every quantized gray level with a specific color. The programmer may assign the color first based on perceptual terms which relate to attributes of sensations of light and color. The selected perceptual colors are encoded (color codes) with specific data as outputs from the lookup table in the computer. A color/graphics adapter card is implemented in the computer to interface with a video monitor. The adapter card inputs display information from the computer through data bus and address bus, and outputs color video and sync signals to drive the color monitor. The digital computer technique requires a computer for processing and storing the image data, in addition to a color/graphics adapter card. Although it is very flexible in programming, it is relatively expensive.

In contrast, optical methods are simpler. In the above-referenced article "A New Coherent....", Liu, et al. described a coherent method for implementing pseudocolor encoding by half-tone screen. The principle of the optical half-tone screen method is as follows: the positive and the negative images of the gray-level input are encoded with two primary colors; for example, red and blue. Then the product of the positive image and the negative image is encoded with the third primary color, in this case green. The superposition of these three color-encoded images results in a pseudocolor image of the gray-level input. The optical system was improved by Yu, as described in U.S. Pat. No. 4,623,245 ("Yu"), in which a white-light source was used replacing lasers. Yu also described in U.S. Pat. No. 4,623,245, "System of White-Light Density Pseudocolor Encoding with Three Primary Colors," that the pseudocolor-encoded image formed at the output plane can be received by an additional color TV camera and then depicted on a color TV monitor.

The principle of the optical method is that three optical masks for three primary colors are generated independently from the same density image following three simple analytic transform functions. The superposition of the three color images results in a pseudocolor output. The main difference between the digital computer technique and the optical technique is that the optical technique utilizes continuous analytic transform functions for direct generation of primary color signals instead of quantized discrete gray-levels such as entries in a look up table. The disadvantage of the optical technique is that the generation of optical masks cannot be performed in real-time. Some optical methods employing liquid crystal televisions are able to perform pseudocoloring in real-time; however, the color and contrast are severely limited by the physical properties of the liquid crystal molecules (F. T. S. Yu, S. Jutamulia, T. W. Lin, X. L. Huang, "Real-Time Pseudocolor-Encoding Using Low-Cost Liquid Crystal Television," *Opt. Laser Tech.* 19, 1987, 45). In another method proposed by Yu (F. T. S. Yu, S. Jutamulia, E. Tam, "Gray Level Pseudocolor Encoding Using a Liquid Crystal Television," *J. Opt.*, (Paris), 19, 1988, 129), primary color images generated by liquid crystal televisions are optically added. To display the pseudocolor-encoded pattern on a TV monitor, an additional color TV camera is required to receive the color images generated on the liquid crystal televisions, since a conventional TV monitor (non-liquid crystal) exhibits no birefringence effect for producing color.

SUMMARY OF THE INVENTION

One aspect of the invention is based on the observation that the continuous analytic transform functions implemented optically by Yu in U.S. Pat. No. 4,623,245 can instead be advantageously implemented electronically and in real-time. The outputs of transformation are the primary color video signals. Three primary color images are displayed on the same color monitor. In the optical method, three primary color images are generated optically using separate optical masks or liquid crystal televisions. Our invention also differs from the digital computer technique. Using computer techniques, the input monochrome video signal is first digitized (sampled and quantized) and stored in the memory. Secondly, the digitized data (gray level and address) is processed usually with a lookup table to assign appropriate color code to each data (color code and address). The processed data (color code and address) is then input to the color/graphics adapter card which finally produces the required video and sync signals for a conventional TV monitor. Our invention, in principle, directly transforms an input monochrome video signal to the pseudocolor video and sync signals for a color monitor. No memory or central processing unit (CPU) is required. As a consequence, a pseudocolor encoder based on our invention has the following advantages: (1) direct transform (as the optical method), (2) high definition (as the digital computer technique), (3) compact (as compared with the optical and digital computer techniques), and (4) low cost (as compared with the optical and digital computer techniques).

One aspect of the invention is directed to an apparatus for generating a first, second and third pseudocolor video signals from monochromatic video signals having a range of possible amplitudes I between 0 and A, A being a predetermined constant. The apparatus comprises means for generating a first pseudocolor video signal whose amplitude is proportional to that of the monochromatic video signal. The apparatus further comprises means for generating a second pseudocolor video signal whose amplitude is proportional to the difference between A and that of the monochromatic video signal; and means for multiplying the first and second pseudocolor signals to provide the third pseudocolor video signal.

The three pseudocolor signals may then be sent to a conventional color TV monitor for displaying three primary color signals; i.e., red (R), green (G), and blue (B). Three independent red, green and blue images are actually formed on the display screen. The display screen can be a color cathode ray tube (CRT), a color liquid crystal flat panel, a color plasma display, or any color display which is driven by standard video color signals.

Given a brightness signal from a monochrome TV camera, a red and a blue signal can be derived as the replica (positive) and the inverse (negative) signal from the original brightness signal, respectively. A green signal is generated as the product of the positive and negative signals. The above-described system is much simpler than the system invented by Yu in U.S. Pat. No. 4,623,245, in which the color-encoded pattern is generated by an optical setup. To perform the monochrome to pseudocolor conversion, a system employing the pseudocolor encoder of this invention will require only a conventional monochrome TV camera, a conventional color TV monitor, and specifically-designed electronic circuits in the encoder to implement the analytic transforms. It is worth noting that in the encoder of the invention, the generation of pseudocolor images can be freely changed by changing the transform functions, which is not possible in the optical method.

Unlike the optical method of Yu, the analytic transform functions that can be implemented using the pseudocolor apparatus of this invention is not limited to the particular function in U.S. Pat. No. 4,623,245 described above. Instead, functions providing improved discrimination and recognition characteristics over the function utilized by Yu may be implemented using the system of this invention. Thus another aspect of the invention is directed towards an apparatus for generating a first, second and third pseudocolor video signals from monochromatic video signals having a range of possible amplitudes I between 0 and A, said range comprising n sections, n being a positive integer. The apparatus comprises means for generating a first, second and third pseudocolor video signals S1, S2, S3 whose amplitudes are constants or functions of I in said n sections, said functions being substantially linear or sinusoidal, wherein at least the amplitudes of the pseudocolor video signals in one section are not constants and are functions of I that are different from the constant or function in at least one other section. The apparatus further comprises means for outputting the three pseudocolor video signals. By dividing the range of possible amplitudes of the monochromatic video signals into sections and selecting an analytic function within each section for transforming a monochromatic video signal into three pseudocolor video signals, where the transform function for each section is distinct and independent of those of other sections, it is possible to generate additional pseudocolors to the three primary pseudocolors red, blue and green, to further enhance the viewer's ability to discriminate and recognize graylevels. Thus in the preferred embodiment, the range of possible values of the monochromatic video signal is divided into seven sections and seven sets of distinct analytic transform functions are adopted, one for each section, to transform the monochromatic video signal into three pseudocolor video signals. In this manner, the full range of pseudocolors utilizing the whole color space may be implemented.

From the above, it is evident that one key advantage the invention has over the optical method of Yu lies in the fact that the apparatus of this invention permits a user to select any particular function from a set of functions (where the amplitudes of the pseudocolor signals are either constants or substantially linear or sinusoidal functions of the monochromatic video signal amplitude), in order to achieve any particular objective in gray-level discrimination and recognition.

Another aspect of the invention is directed to a system for providing pseudocolor images of objects comprising a monochromatic television camera for providing monochromatic video signals in response to objects, a pseudocolor encoder for generating a first, second and third pseudocolor video signals in response to the monochromatic video signals in real-time and color monitor means responsive to said three pseudocolor video signals for displaying pseudocolor images of the objects. The system further comprises a housing for holding the camera, the encoder and the monitor means. The system is compact and portable and is therefore very convenient for users. This is in contrast to conventional systems where the television camera, the pseudocolor encoder, and the color monitor all have their own casings and are generally bulky. Such conventional systems are inconvenient for transport and are therefore less flexible compared to the portable system of this application.

DETAILED DESCRIPTION OF THE PREFERRED EMBODIMENT

Figure 1:
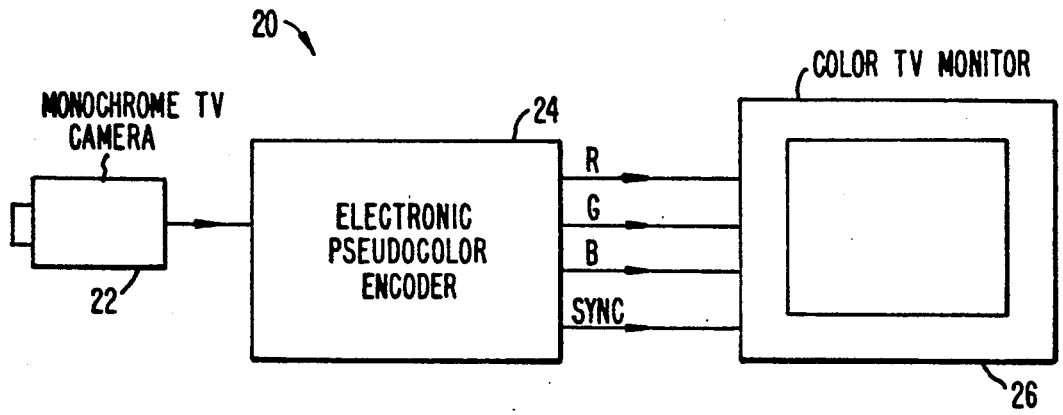
FIG. 1 is a block diagram of a pseudocolor image system to illustrate the invention.

The present invention is a system 20 including three primary parts as shown in FIG. 1. A monochrome TV camera 22 or other video signal generator such as a computer, inputs a monochrome video signal into the electronic system or encoder 24 which generates three primary color signals from the input monochrome signal. The monochrome video signal includes a sync signal which is separated by the electronic system or encoder 24 in the generation process. The generated color signals, together with the sync signal, are fed to a color TV monitor 26 such that a pseudocolor-encoded image can be displayed. Of course, these R, G and B signals, together with the sync signal, can be combined in a standard NTSC color signal by a standard video signal converter.

Figure 2B:
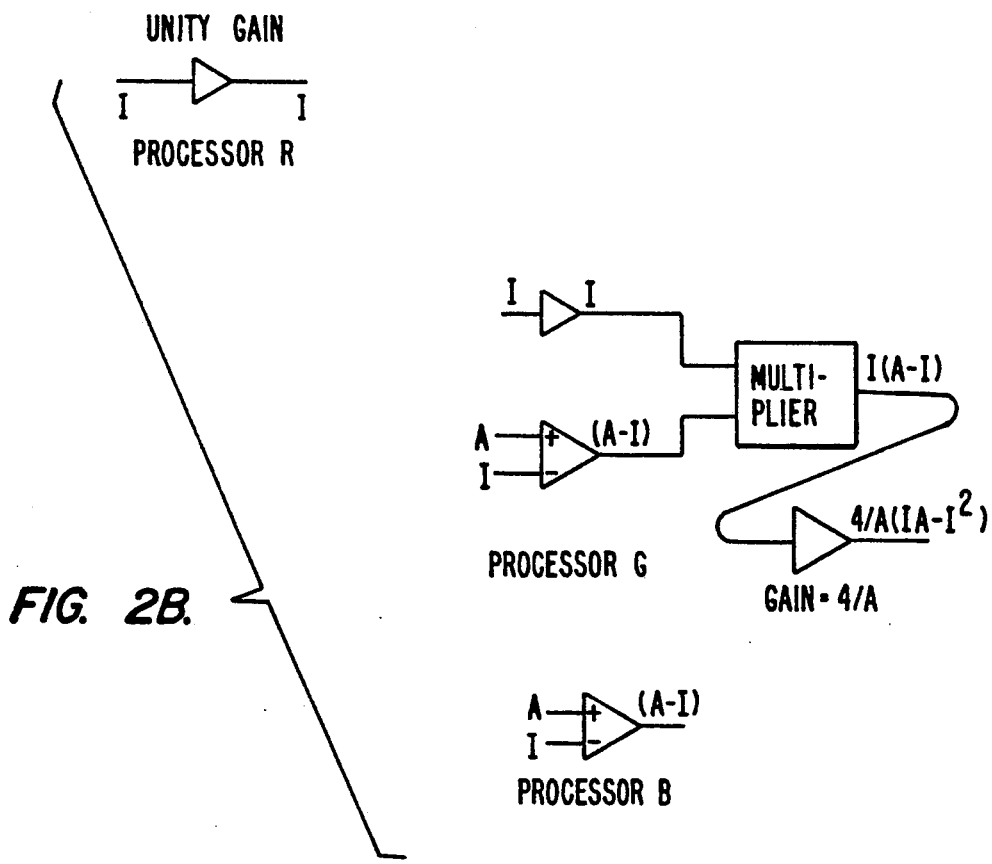
FIG. 2B are schematic circuit diagrams illustrating in more detail the embodiment of FIG. 2A.
Figure 2A:
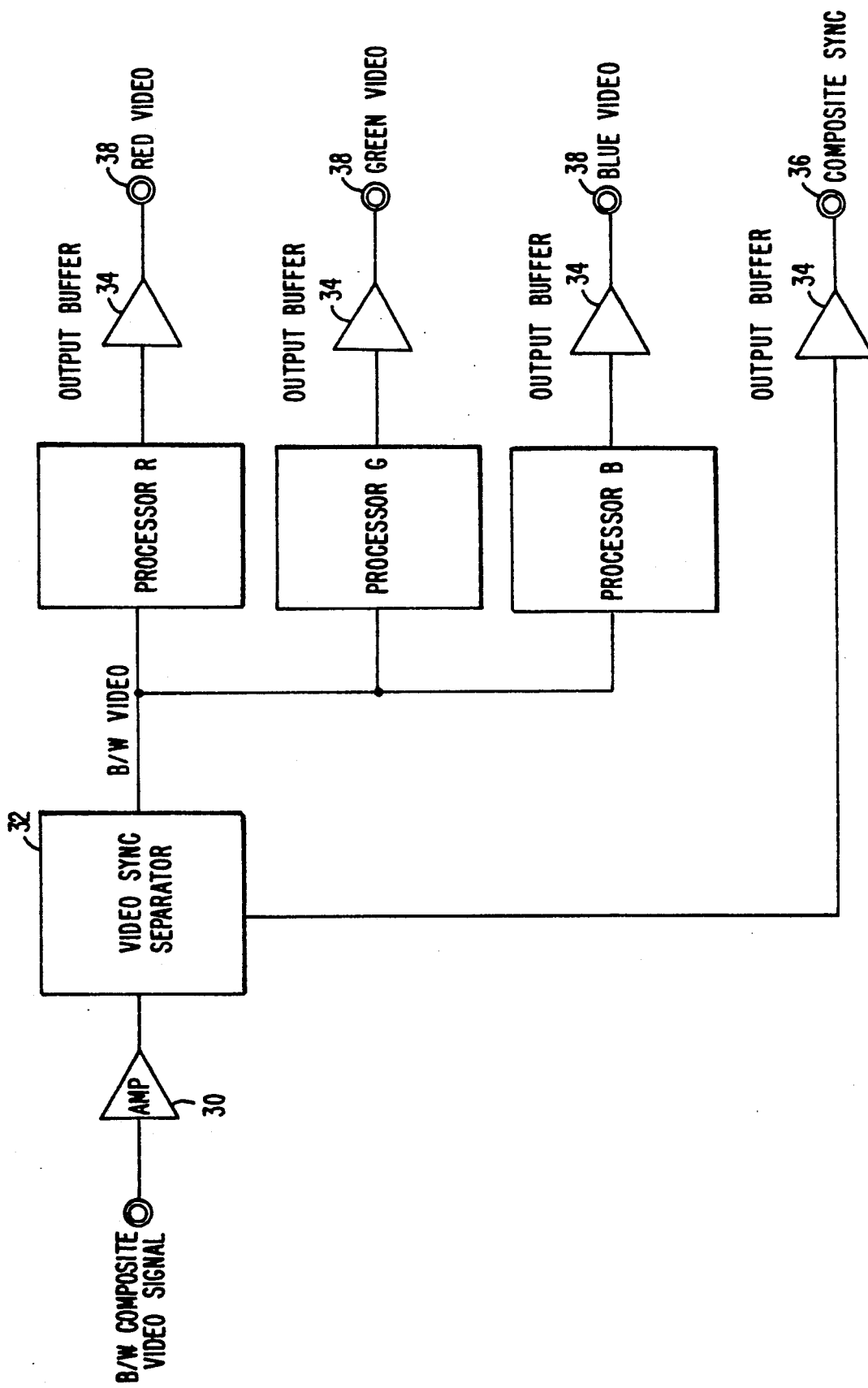
FIG. 2A is a block diagram illustrating in more detail an analog embodiment of the pseudocolor encoder of FIG. 1.

The full analog electronic system is depicted schematically in FIG. 2A. The input of the electronic system is a B/W composite video signal that may come from a monochrome TV camera or a computer. The input signal is fed into the amplifier 30 and then the separator 32 which separates the B/W video (brightness) signal from the sync signal. The sync signal is directly connected through an output buffer 34 to the output port 36. The brightness signal is then split to three identical signals as inputs for the processor R, processor G and processor B. The outputs from the processors R, G and B are connected through output buffers 34 to the output port 38 of the electronic system which provides red (R), green (G) and blue (B) signals for a color TV monitor.

Following the algorithm o the optical method mentioned previously, the R, G and B signals can be obtained as follows. If the brightness signal is denoted by I, $0 \leq I \leq A$, signals R, G and B are:

$$R = I, \quad (1)$$

$$G = 4 I/A (A - I) = 4/A (IA - I^2), \quad (2)$$

$$B = (A - I), \quad (3)$$

where A is a predetermined constant.

Figure 3:
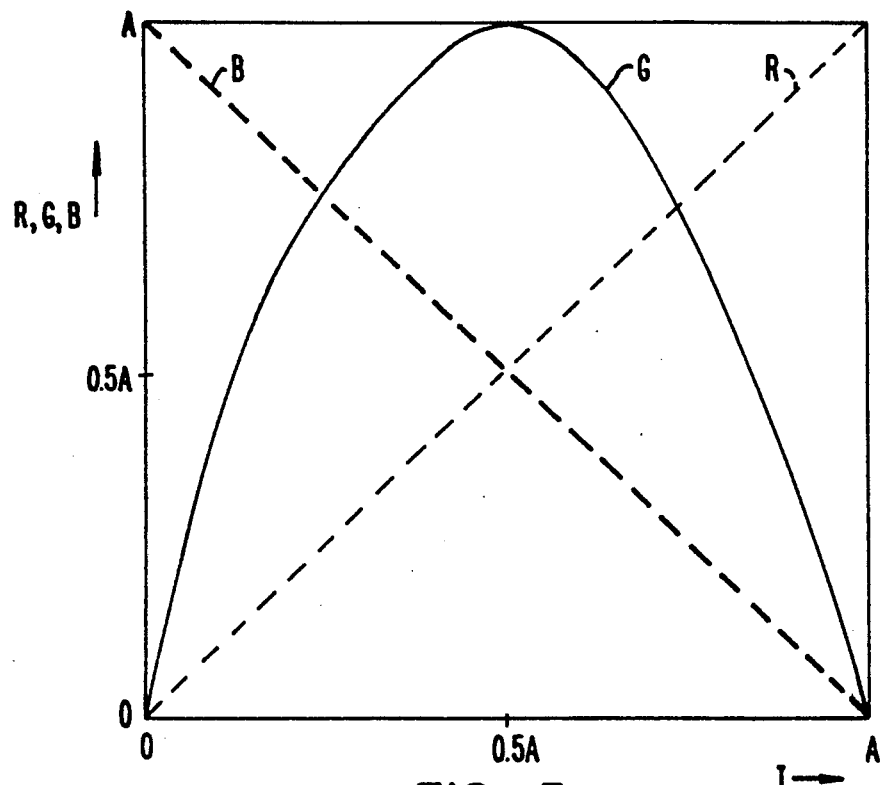
FIG. 3 is a graphical illustration of R, G and B analytic transform functions for transforming a monochromatic input into three pseudocolor outputs.

To get these outputs, the processor R is only an unity gain amplifier, the processor G includes a multiplier, amplifiers, and a differential amplifier, and the processor B is a differential amplifier as shown in FIG. 2B. The functions of the resultant R, G and B versus I are shown in FIG. 3. The color output from the transformation expressed in Equations (1) to (3) is not visually attractive. This transformation is used in the optical method because it is difficult to implement optically a transformation different from that of Equations (1) to (3). In other words, Equations (1) to (3) can be easily realized optically.

In the Equations (1) to (3) above, it will be observed that the three pseudocolor signals R, G, B may be interchanged so that, for example, G is given by Equation (1), B by Equation (2) and R by Equation (3), or actually by any other possible permutation. For this reason, the three Equations may be generalized by replacing R, G, B by signals S1, S2, S3 instead. Thus, in this application, where transform functions are described or illustrated in the figures by reference to R, G, B, it will be understood that these functions may be generalized by replacing them with S1, S2, S3 instead. All such variations are within the scope of the invention. In fact, in many of the equations below, the transform functions are expressed in terms of S1, S2 and S3.

However, a variety of transform functions can be implemented electronically, which will produce more attractive color output. For example, the following equations:

$$S1 = 2(I - 0.5A), \quad I \geq 0.5A, \quad (4)$$
$$= 0, \quad I < 0.5A,$$

$$S2 = 2(A - I), \quad I \geq 0.5A, \quad (5)$$
$$= 2I, \quad I < 0.5A,$$

$$S3 = 0, \quad I \geq 0.5A, \quad (6)$$
$$= 2(0.5A - I), \quad I < 0.5A,$$

where the monochromatic signal amplitude I takes on values between 0 and A, a predetermined constant.

The processors R, G and B can be made using analog electronic circuits consisting of subtractors, inverters and amplifiers. The functions of the resultant R, G and B versus I is given in FIG. 4. For instance, we can see from FIG. 4 that when I is maximum (bright), that is equal to A, we will get red color; when I is of an intermediate value e.g. 0.5A, we will see green color; and when I is minimum or 0 (dark), we will see blue color. Between pure red and pure green, there is a gradually changing mixture of red and green. Similarly, an area of gradually changing color is in between pure green and pure blue.

Better Algorithms

Figure 5:
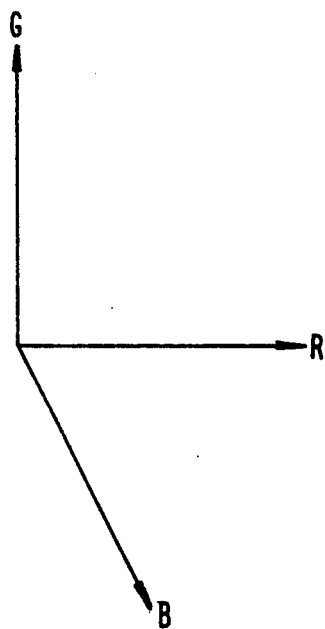
FIG. 5 is an illustration of a three-dimensional color space formed by red, green and blue primary colors.

The three primary colors form a color space as shown in FIG. 5 [C. H. Radewan, "Digital Image ..."]. It is possible to represent all the colors that can be produced as points in the three dimensional color space. This color space can be related to normally perceived color attributes; namely: hue, saturation and brightness. Hue is the attribute of a color perception denoted by blue, red, green, yellow and so on. Saturation is the relative difference from gray or white. Brightness is a function of the radiant intensity.

Figure 4:
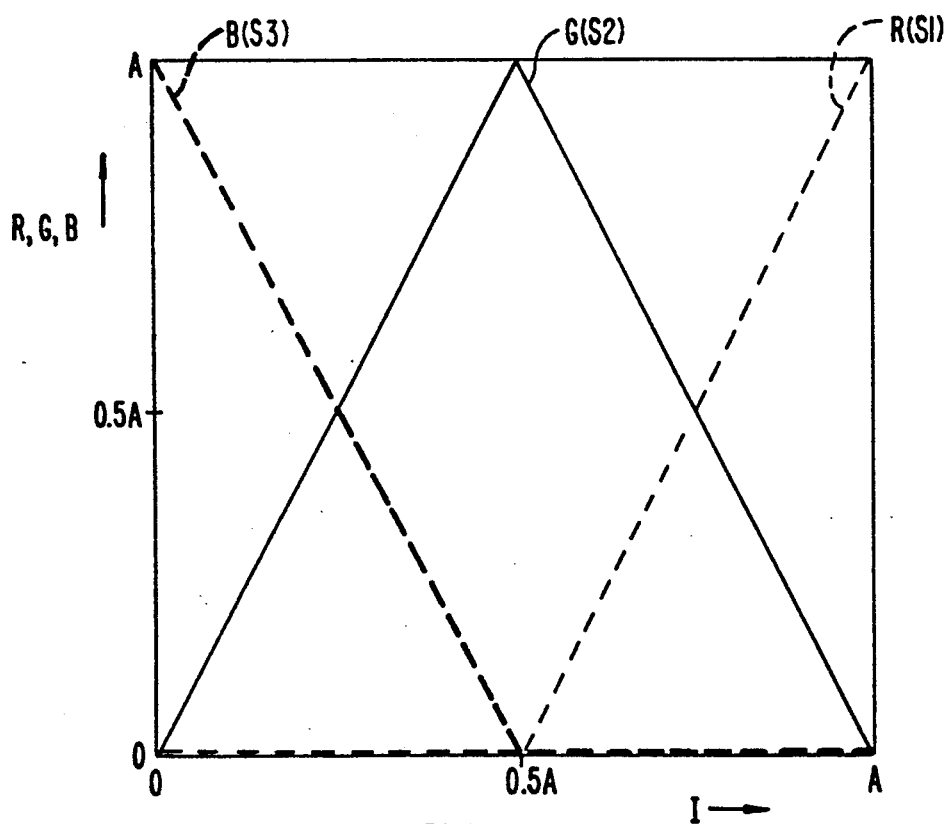
FIG. 4 is a graphical illustration of analytic transform functions for transforming monochromatic video signals into three pseudocolor video signals.
Figure 6:
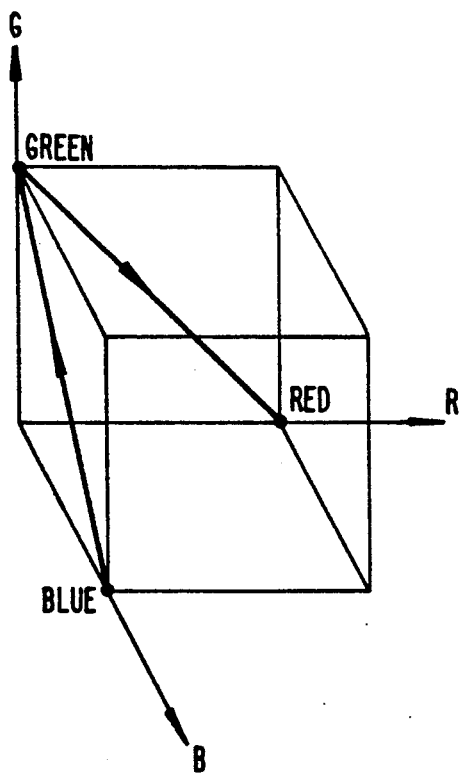
FIG. 6 is a schematic illustration of a pseudocolor map of the transform functions of FIG. 4 represented in the color space.
Figure 7:
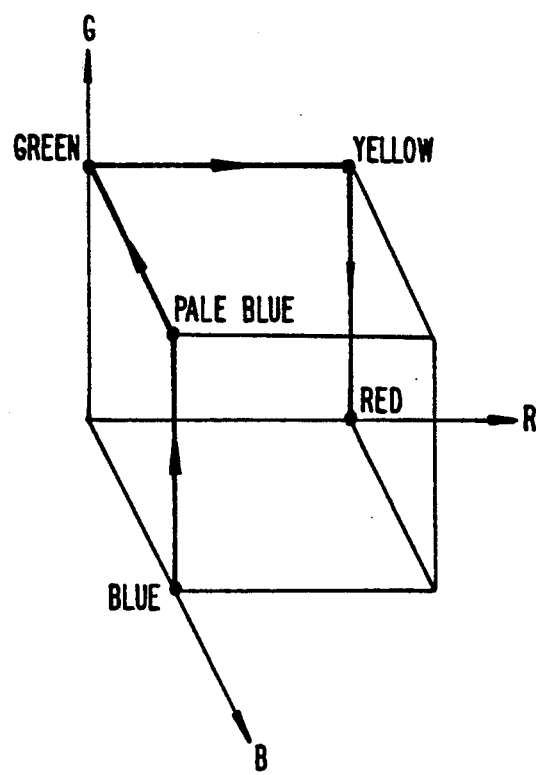
FIG. 7 is a pseudocolor map arrived at by modifying the pseudocolor map of FIG. 6 to maximum saturation and brightness.

FIG. 3 shows blue and red hues with maximum saturation (pure color); however, the green hue never achieves maximum saturation. This is the reason that the optical method does not give an attractive color output. FIG. 4 can be represented in the color space as shown in FIG. 6. This shows a pseudocolor map with maximum saturation and nearly constant brightness. This map can be modified to maximum saturation and maximum brightness as shown in FIG. 7. The functions of R, G and B versus I to give the maximum saturation and brightness of FIG. 7 are given in FIG. 8. This can be expressed mathematically as follows:

$$S1 = 0, \quad 0 \leq I < 0.5A, \quad (7)$$
$$= 4(I - 0.5A), \quad 0.5A \leq I < 0.75A,$$
$$= A, \quad 0.75A \leq I \leq A,$$

$$S2 = 4I, \quad 0 \leq I < 0.25A, \quad (8)$$
$$= A, \quad 0.25A \leq I < 0.75A,$$
$$= 4(A - I), \quad 0.75A \leq I \leq A,$$

$$S3 = A, \quad 0 \leq I < 0.25A, \quad (9)$$
$$= 4(0.5A - I), \quad 0.25A \leq I < 0.5A,$$
$$= 0, \quad 0.5A \leq I \leq A,$$

where the monochromatic signal amplitude I takes on values between 0 and A, a predetermined constant.

Figure 9:
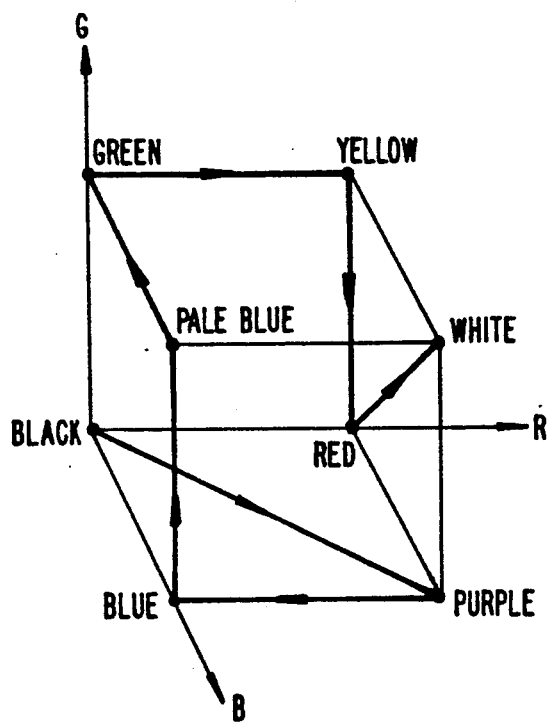
FIG. 9 is a pseudocolor map illustrating transform functions fully utilizing the color space with maximum saturation and maximum brightness with increasing brightness in the initial step.
Figure 10:
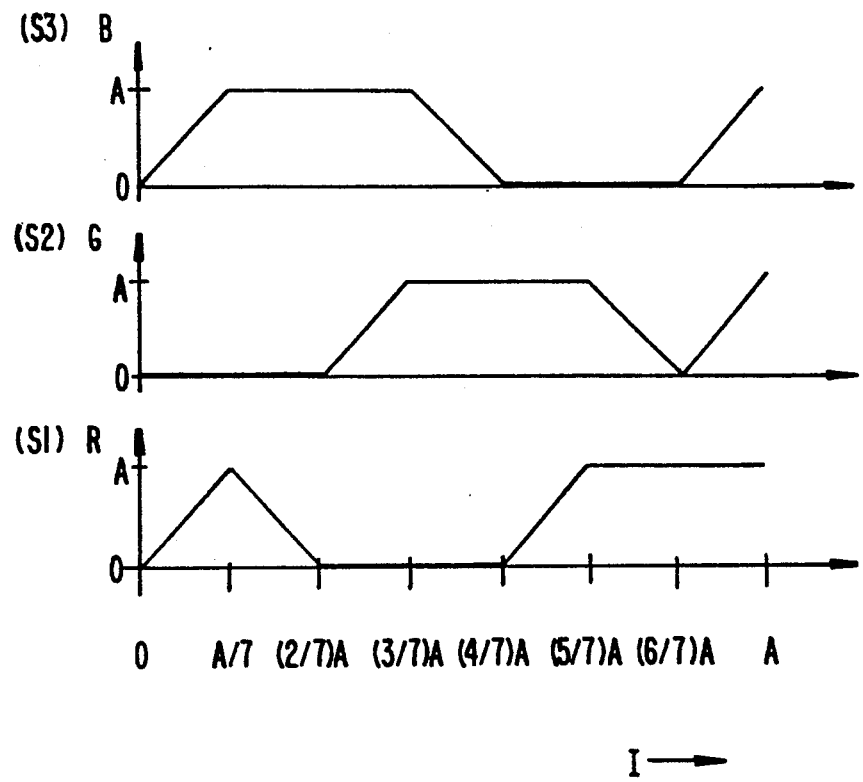
FIG. 10 are graphical illustrations of red, green and blue analytic transform functions implementing the pseudocolor map of FIG. 9.

The color change as a function of the brightness is as follows: Blue→Pale Blue→Green→Yellow→Red. As shown in FIGS. 6 and 7, we still do not utilize the whole color space. An algorithm which fully utilizes the color space is illustrated in FIG. 9. This is a version of maximum saturation and maximum brightness with increasing brightness in the initial step. The color change is: Black→Purple→Blue→Pale Blue→Green Yellow→Red→White. The functions of R, G and B versus I (or more generally the S1, S2, S3 functions) are illustrated in FIG. 10, while the mathematical expression is given below.

$$S1 = 7I, \quad 0 \leq I < A/7, \quad (10)$$
$$= 7(2/7A - I), \quad A/7 \leq I < 2A/7,$$
$$= 0, \quad 2A/7 \leq I < 4A/7,$$
$$= 7(I - 4A/7), \quad 4A/7 \leq I < 5A/7,$$
$$= A, \quad 5/7A \leq I \leq A,$$

$$S2 = 0, \quad 0 \leq I < 2A/7, \quad (11)$$
$$= 7(I - 2A/7), \quad 2A/7 \leq I < 3A/7,$$
$$= A, \quad 3A/7 \leq I < 5A/7,$$
$$= 7(6A/7 - I), \quad 5A/7 \leq I < 6A/7,$$
$$= 7(I - 6A/7), \quad 6A/7 \leq I \leq A,$$

$$S3 = 7I, \quad 0 \leq I < A/7, \quad (12)$$
$$= A, \quad A/7 \leq I < 3A/7,$$
$$= 7(4A/7 - I), \quad 3A/7 \leq I < 4A/7,$$
$$= 0, \quad 4A/7 \leq I < 6A/7,$$
$$= 7(I - 6A/7), \quad 6A/7 \leq I \leq A,$$

where the monochromatic signal amplitude I has a range between 0 and A, a predetermined constant.

Figure 11:
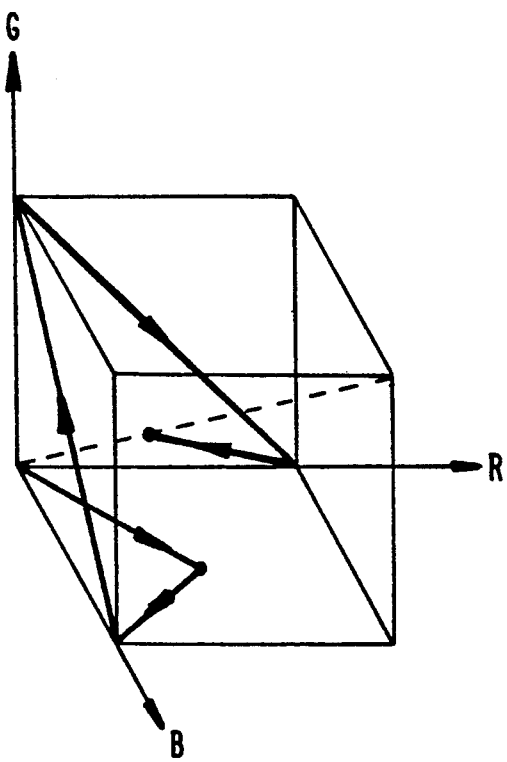
FIG. 11 is a pseudocolor map arrived at by modifying the map of FIG. 9, illustrating red, green and blue analytic transform functions with maximum saturation and nearly constant brightness.
Figure 12:
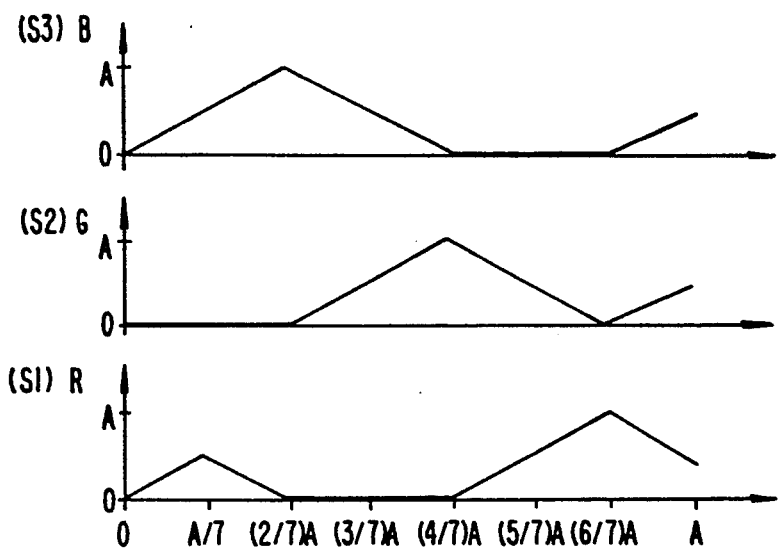
FIG. 12 is a graphical illustration of the red, green and blue transform functions of FIG. 11.

An alternative is illustrated in FIG. 11, which is a pseudocolor mapping with maximum saturation and nearly constant brightness. The R, G and B functions (or more generally S1, S2, S3 functions) by which the mapping of FIG. 11 is achieved are illustrated in FIG. 12. The analytic equations are given as follows:

$$S1 = 7/2I, \quad 0 \leq I < A/7, \quad (13)$$
$$= 7/2(2A/7 - I), \quad A/7 \leq I < 2A/7,$$
$$= 0, \quad 2A/7 \leq I < 4A/7,$$
$$= 7/2(I - 4A/7), \quad 4A/7 \leq I < 6A/7,$$
$$= 14/3(15/14A - I), \quad 6A/7 \leq I \leq A,$$

$$S2 = 0, \quad 0 \leq I < 2A/7, \quad (14)$$
$$= 7/2(I - 2A/7), \quad 2A/7 \leq I < 4A/7,$$
$$= 7/2(6A/7 - I), \quad 4A/7 \leq I < 6A/7,$$
$$= 7/3(I - 6A/7), \quad 6A/7 \leq I \leq A,$$

-continued $$S3 = 7/2\,I, \quad 0 \leq I < 2A/7, \quad (15)$$
$$= 7/2\,(4A/7 - I), \quad 2A/7 \leq I < 4A/7,$$
$$= 0, \quad 4A/7 \leq I < 6A/7,$$
$$= 7/3\,(I - 6A/7), \quad 6A/7 \leq I \leq A,$$

where the monochromatic signal amplitude I has a range between 0 and A, a predetermined constant.

Figure 13:
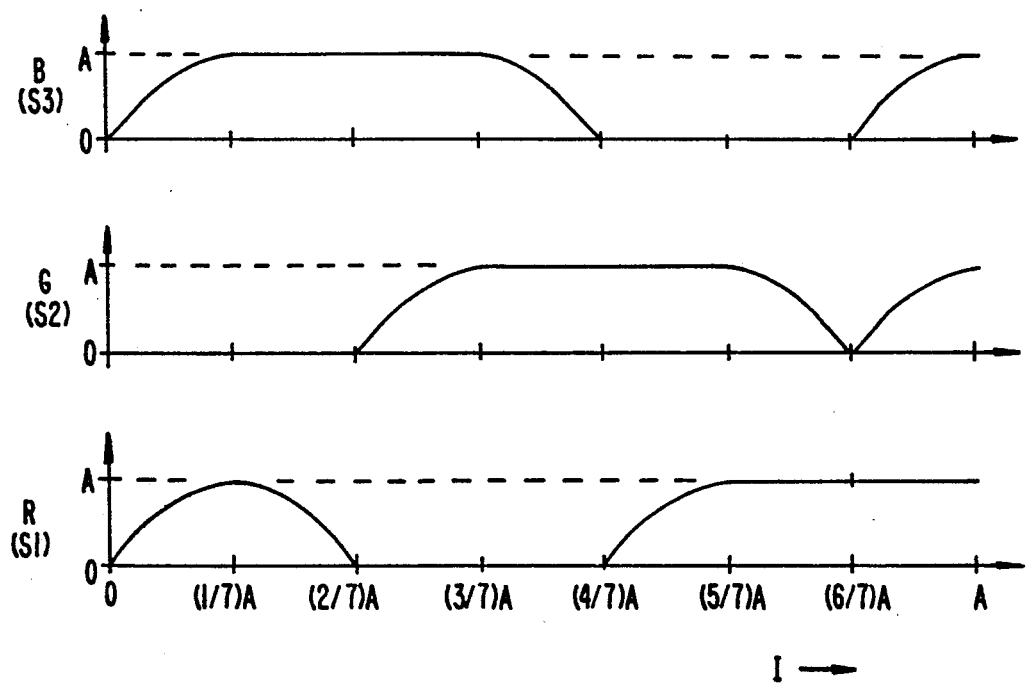
FIG. 13 is a graphical illustration of analytic transform functions for transforming a monochromatic video signal into three pseudocolor outputs.

Many of Equations (4) to (15) are simple linear equations. Thus, they can be very easily implemented by an analog electronic circuit using amplifiers, differential amplifiers, voltage dividers, comparators, etc. It will be understood, however, that the amplitudes of the three pseudocolor video signals may also be sinusoidal (sine or cosine type) functions of the monochromatic video signal amplitude I; such and other similar functions are within the scope of the invention. One set of functions for the transforming the monochromatic video signal amplitude I with values in a range 0 and A, A being a predetermined constant, into three pseudocolor video signal amplitudes are illustrated in FIG. 13 and given by the equations below:

$$S1 = A \sin[(7\pi/2A)\,I], \quad 0 \leq I < 2A/7, \quad (16)$$
$$= 0, \quad 2A/7 \leq I < 4A/7,$$
$$= A \sin[(7\pi/2A)\,I], \quad 4A/7 \leq I < 5A/7,$$
$$= A, \quad 5A/7 \leq I \leq A,$$

$$S2 = 0, \quad 0 \leq I < 2A/7, \quad (17)$$
$$= A \sin[(7\pi/2A)(I - 2A/7)], \quad 2A/7 \leq I < 3A/7,$$
$$= A, \quad 3A/7 \leq I < 5A/7,$$
$$= A \sin[(7\pi/2A)\,I], \quad 5A/7 \leq I < 6A/7,$$
$$= A \sin[(7\pi/2A)(I - 2A/7)], \quad 6A/7 \leq I < A,$$

$$S3 = A \sin[(7\pi/2A)\,I], \quad 0 \leq I < A/7, \quad (18)$$
$$= A, \quad A/7 \leq I < 3A/7,$$
$$= A \sin[(7\pi/2A)(I - 2A/7)], \quad 3A/7 \leq I < 4A/7,$$
$$= 0, \quad 4A/7 \leq I < 6A/7,$$
$$= A \sin[(7\pi/2A)(I - 2A/7)], \quad 6A/7 \leq I < A.$$

It will be noted that in Equations (4) to (18) and as illustrated in the accompanying figures, if any, the possible range of values for I, the monochromatic video signal amplitude, is divided into sections. In Equations (4) to (6) and FIG. 4, for example, the range is divided into four sections (0 to 0.25A, 0.25A to 0.5A, 0.5A to 0.75A and 0.75A to A), where the amplitudes of the three pseudocolor video signals are either constants or linear functions of I in each of the four sections. Thus constant values or functions may be defined for each of the four sections for each of the three pseudocolor video signal amplitudes, where the constants or functions defined for each section may be different from those of other sections, except that, preferably, the constants or functions are such that at each of the junctions (0.25A, 0.5A and 0.75A) between a pair of adjacent sections, the amplitudes of the pseudocolor video signal amplitudes take on the same values according to the constants or functions in the pair of adjacent sections. It will also be noted that the amplitudes of the three pseudocolor video signals in at least one section are not constants and are different from the constants or functions in at least one other section. The above generalization applies also to the case of other equations such as Equations (7) to (18) and their accompanying figures.

Hybrid Analog-Digital System

Figure 14:
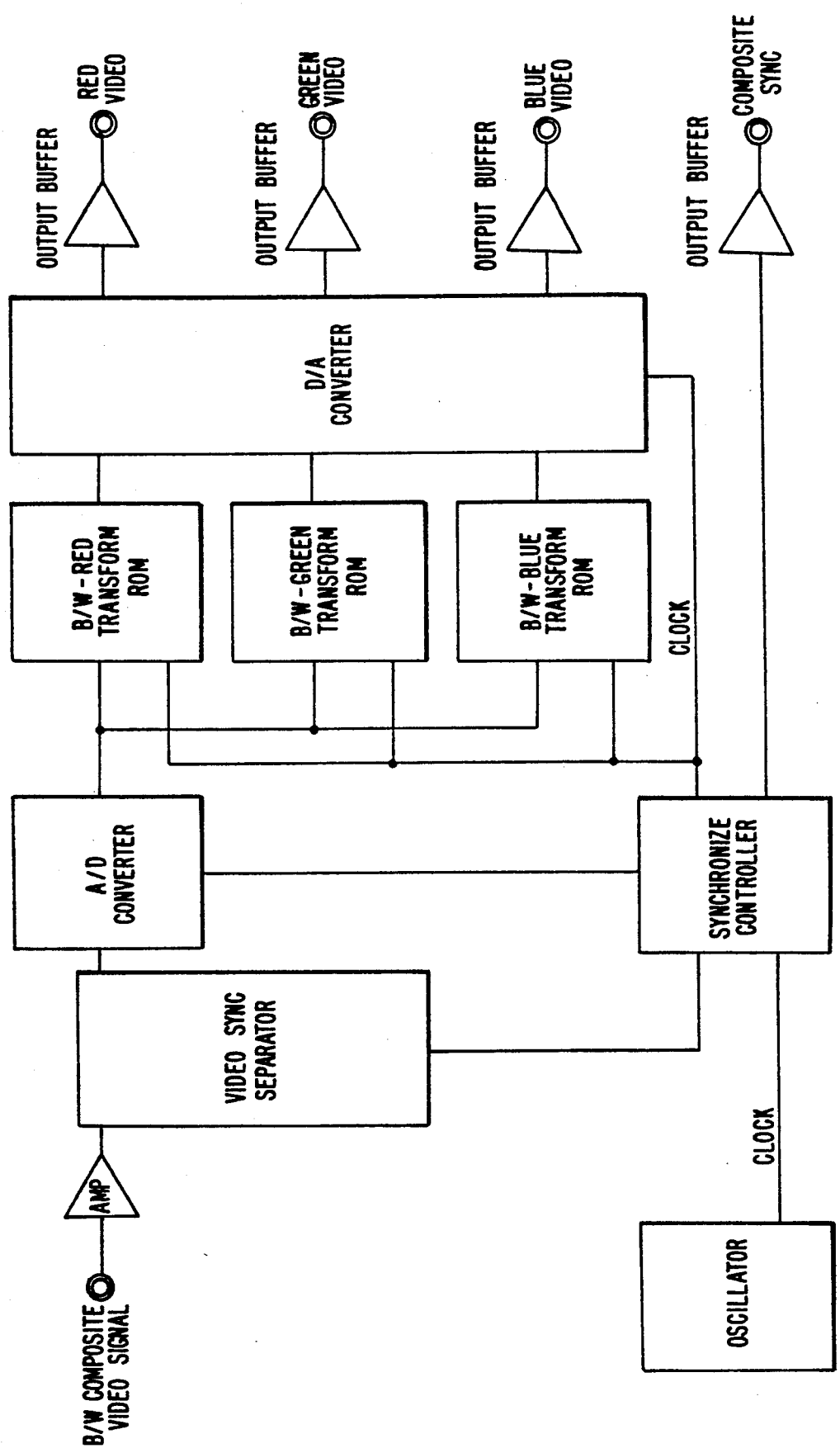
FIG. 14 is a block diagram of a hybrid analog-digital pseudocolor encoder illustrating the preferred embodiment of the pseudocolor encoder of FIG. 1.

The analytic transformation given by Equations (1) to (18) can also be performed by digital processors. This hybrid analog-digital system differs from conventional computer techniques. The system has no memory to hold the data frame by frame. In other words, there are no data bus and address bus. The input data is processed on-line (real-time), as in the case of the full analog system. However, the transformation is performed digitally in a specific read only memory (ROM). The ROMs can be written with a programmable ROM writer. This gives an additional merit to the hybrid analog-digital system that the transform functions can be changed without physically changing the electronic circuit. There are A/D converter and D/A converter prior to and after ROMs. The complete block diagram of the hybrid analog-digital system is illustrated in FIG. 14. The monochrome (B/W composite) video signal is first input to an amplifier. The amplified signal is fed into a video sync separator. The separated B/W video signal goes to the A/D converter, split to three inputs for B/W to red, B/W to green, and B/W to blue transform ROMs. The red (R), green (G) and blue (B) transformed outputs are passed through D/A converters resulting in analog signals for R, G and B video signals. The separated sync signal is input to the sync controller together with a clock signal. The sync controller outputs clock signals for A/D converter, transform ROMs and D/A converter, and composite sync signal for color monitor.

Compact Hand-Held Pseudocolor Encoder

The electronic systems illustrated in FIGS. 2 and 14 can be made and packaged in a box as an adapter from a monochrome TV camera or other video signal sources to a color TV monitor for producing pseudocolor images. As is mentioned previously, the present invention does not require a bulky optical setup or computer system; therefore, it can be made in a compact form.

Figure 15:
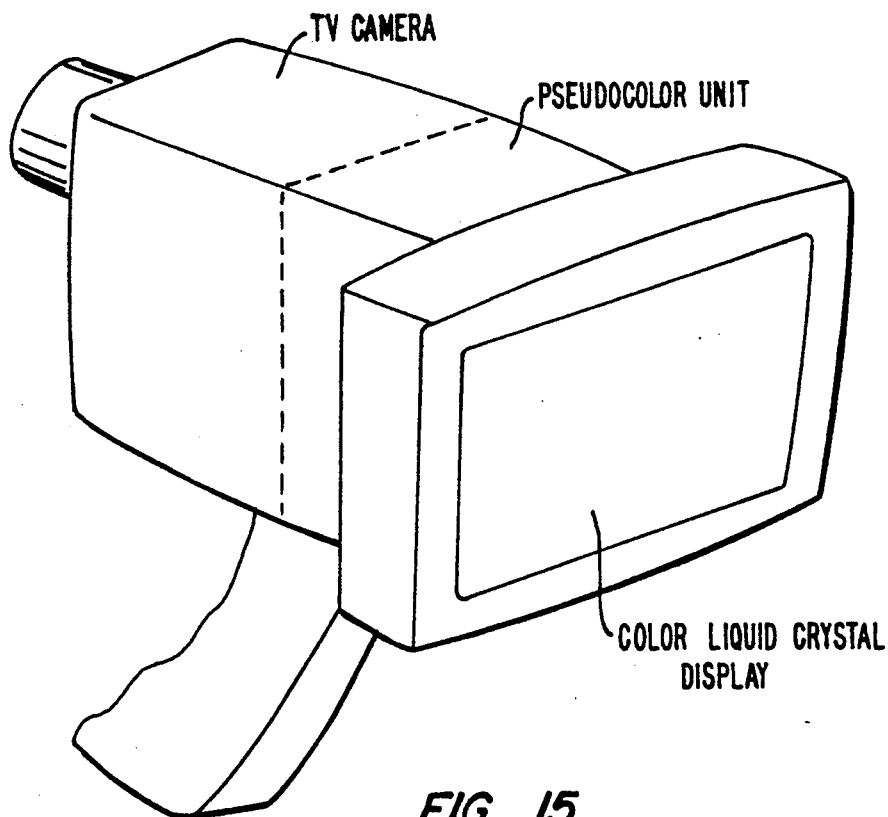
FIG. 15 is a schematic view of a compact, hand-held pseudocolor system comprising a pseudocolor encoder, a television camera, and a color liquid crystal display.
Figure 16:
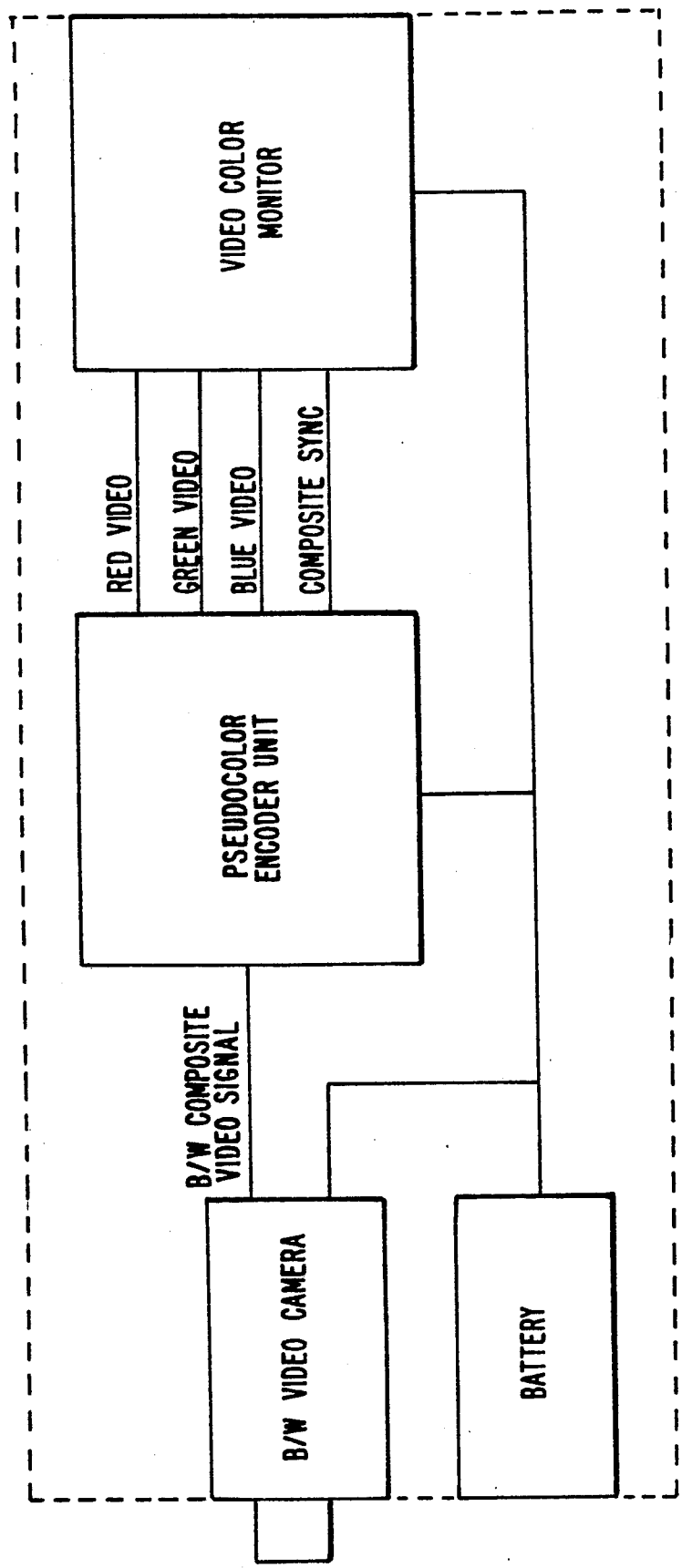
FIG. 16 is a block diagram of the pseudocolor system of FIG. 15.

The present invention includes a compact hand-held pseudocolor encoder based on the method of analytic transformation mentioned previously. The schematic and block diagrams are illustrated in FIGS. 15 and 16, respectively. The compact hand-held pseudocolor encoder is composed of a monochrome TV camera, an electronic encoding system (full analog or hybrid analog-digital), and a color liquid crystal TV monitor assembled in a single unit. This compact system can be used in industrial and medical applications. An infrared or thermal imaging TV camera can be used as well as an ordinary TV camera. A myriad of applications can be found for the compact hand-held pseudocolor encoder and the adapter-type pseudocolor encoder. If desired, the encoder may be used to perform the transformations as defined in any one set of the Equations (1) through (18) above.

This invention is particularly advantageous since a complex color transform function can be implemented by means of a number of simpler functions in n sections, n being a positive integer. In this manner, the simple function in each section can be implemented with relatively simple electronic circuits. For this reason, the simple circuits can be accommodated on a printed circuit board with a dimension less than 5.47 inches by 8.27 inches in the pseudocolor encoder. Even when the television camera and the liquid crystal television monitor together with the pseudocolor encoder are placed within the same housing as shown in FIGS. 15 and 16, the system that results is still compact. Applicants have found that the housing for all three components can be made to be less than 10 inches in length, six inches in width, and six inches in height. The total weight of the three components and the housing can be reduced to less than 900 grams from 10 kilograms or more for conventional systems employing television camera, image processing (computer) unit and television monitor as separate units. The weight reduction is possible by adopting state-of-the-art miniaturized camera and liquid crystal television technologies and the simple electronic implementation of the pseudocolor transform functions described above. The portable compact unit of this invention will make possible a number of new applications. For example, a security guard may take this portable unit equipped with thermal camera to check if there is a thermal abnormality caused, for example, by fire. The military may use the unit for night vision. The medical industry or industrial production may use the unit for detecting thermal and X-ray distribution or light distribution. Due to the relatively simple electronic implementation, the cost of the total system is low as compared to conventional complex systems.

Figure 8:
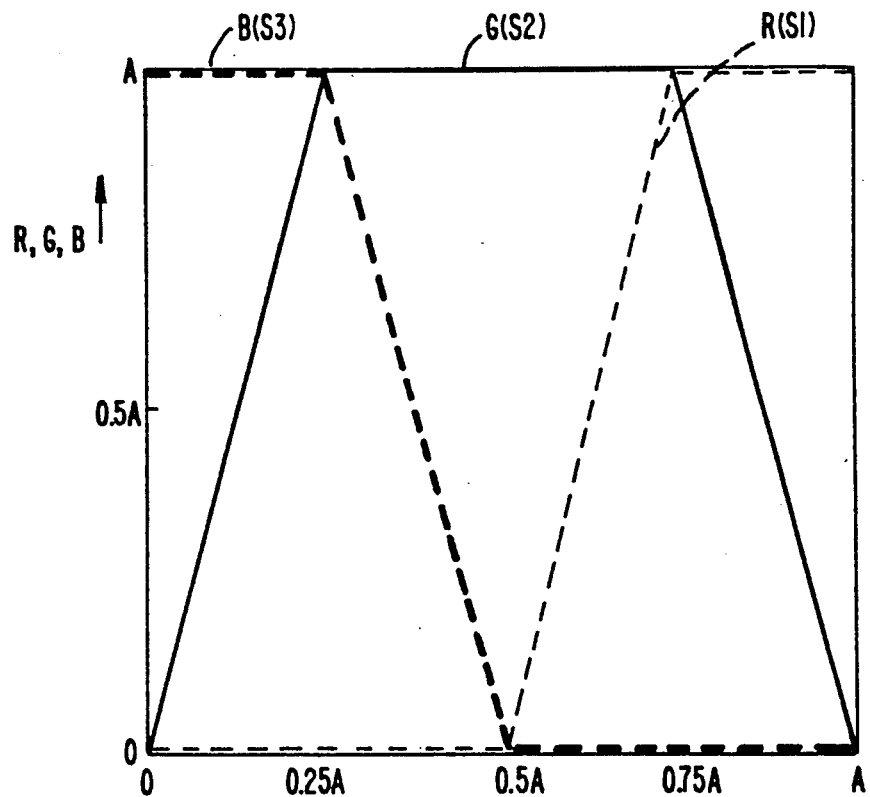
FIG. 8 is a graphical illustration of red, green and blue analytic transform functions implementing the pseudocolor map of FIG. 7.
Figure 18C:
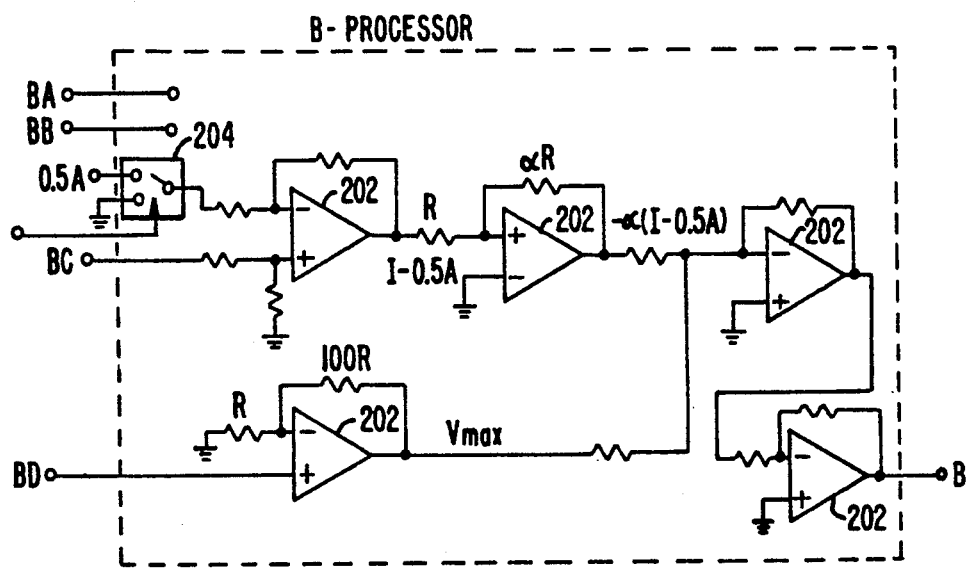
FIGS. 18A, 18B, 18C are schematic circuit diagrams of portions of the red, green and blue processors of FIG. 2A.
Figure 17A:
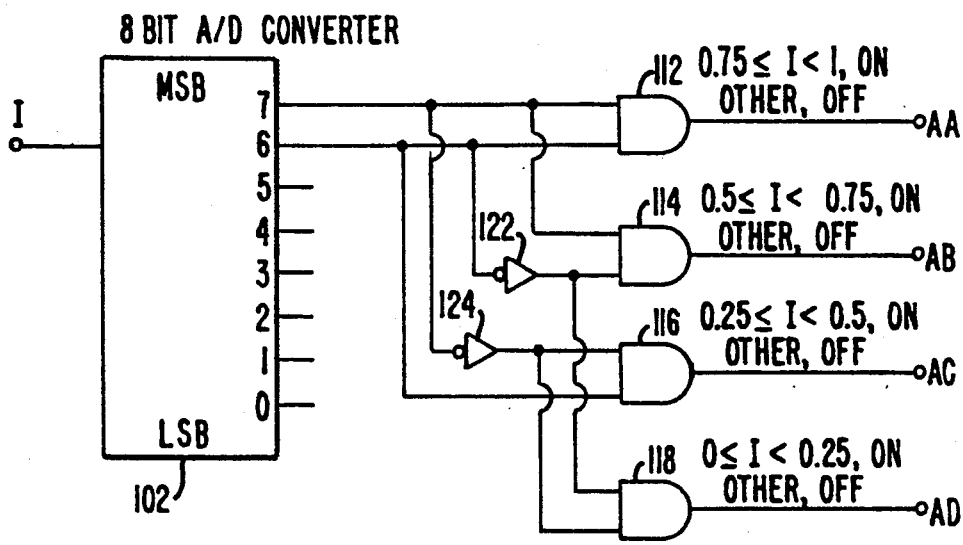
FIGS. 17A, 17B are schematic circuit diagrams of pre-processing circuits within the red, green and blue processors of the analog pseudocolor encoder of FIG. 2A.
Figure 17B:
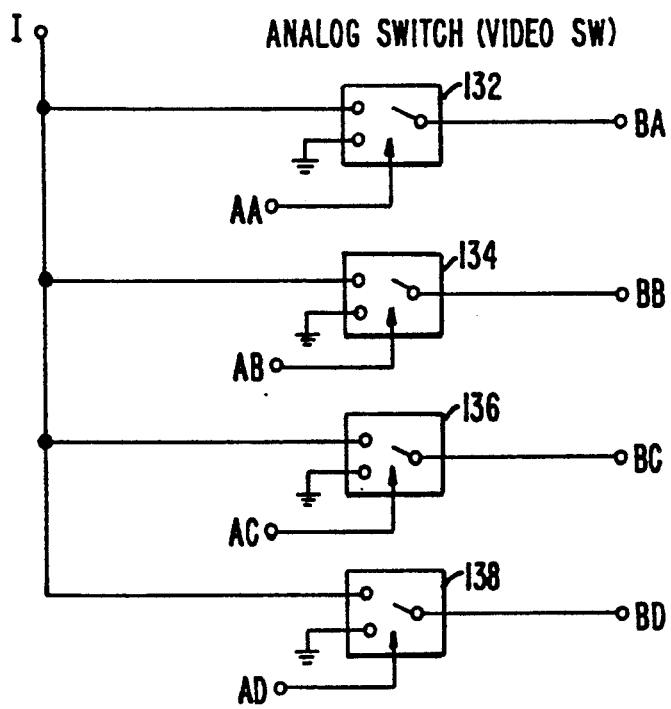
Figure 18A:
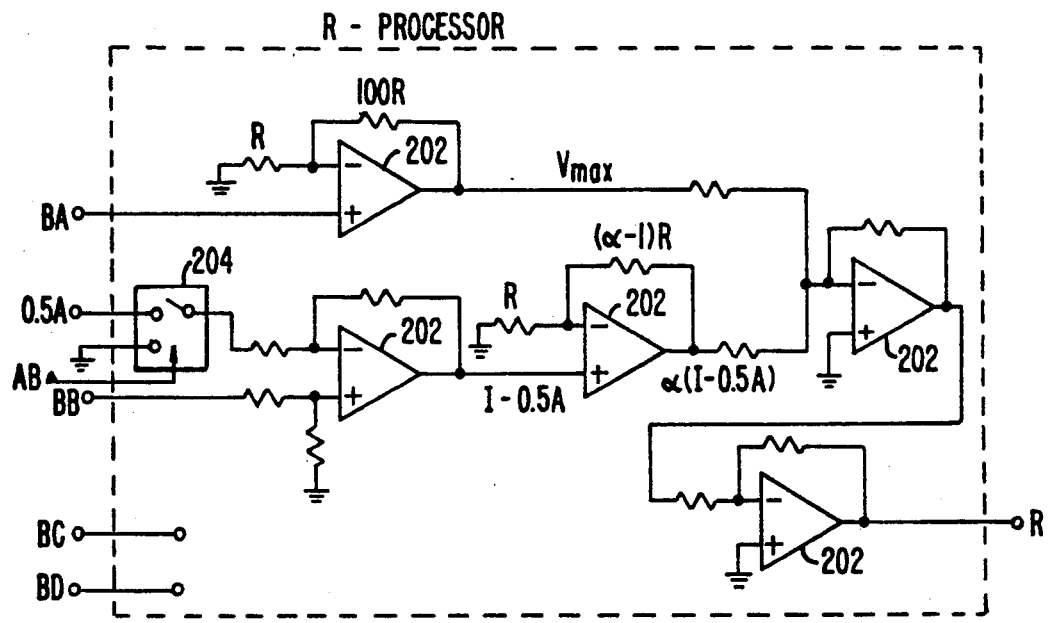
Figure 18B:
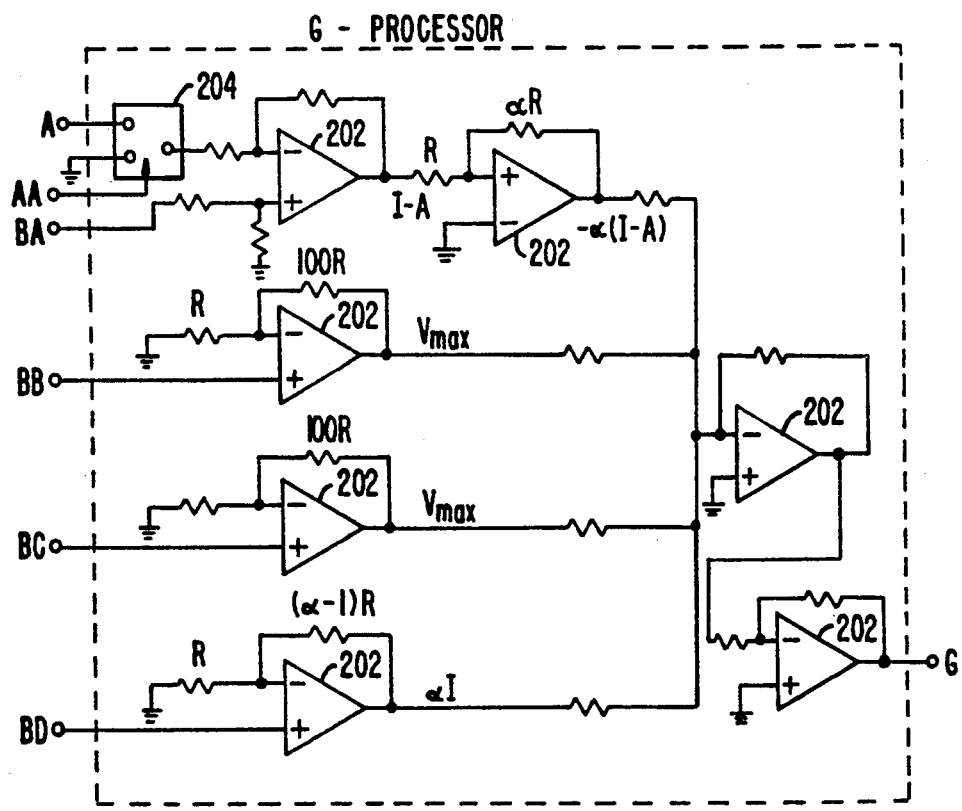

FIGS. 17A, 17B are schematic circuit diagrams of pre-processing circuits with red, green and blue processors of the analog pseudocolor encoder of FIG. 2A for implementing the transform functions of FIG. 8 and Equations (7) through (9). In reference to FIG. 8, the range of values from 0 to A for the monochromatic video signal I is divided into four sections: 0 to 0.25A, 0.25A to 0.5A, 0.5A to 0.75A and 0.75A to A. Then four different sets of separate functions are defined, one set for each of the four sections. The pre-processing circuit of FIGS. 17A, 17B generate the control signals for selecting the particular set of functions depending on the magnitude of the monochromatic video signal amplitude I. For this purpose the monochromatic video signal I is fed to an 8 bit A/D converter 102. The two most significant bits (7 and 6) of the output of the converter 102 are connected to four AND-gates 112, 114, 116 and 118, where bit 6 of the output converter is connected to gates 114-118 through inverters 122, 124 as shown in FIG. 17A. The outputs of the four AND-gates are four control signals AA, AB, AC, AD. The conditions under which any one of the four control signals will be high (or on) or low (or off) are indicated in FIG. 17A. The four control signals are used to control analog switches 132-138 of FIG. 17B as shown. When signal AA is high or on, for example, switch causes the monochromatic video signal I to be connected to the node BA; where signal AA is low or off, node BA is connected to ground instead. Similarly, nodes BB, BC, BD are connected to the monochromatic input when their corresponding control signals AB, AC, AD are high, but are connected to ground if their corresponding control signals are low or off. The R-processor, the G-processor, and B-processor are shown in FIGS. 18A-18C, where $\alpha$ has the value $V_{MAX}/0.25$. The control signals AA, AB, AC, AD and the nodes BA, BB, BC, BD in the preprocessing circuits of FIGS. 17A, 17B are connected to the three processes as shown in FIGS. 18A-18C. The three processors each contains five to seven operational amplifiers 202, a number of resistors with the values as shown, and a switch 204. The R and B-processors each has two parallel branches, where normally only one branch is operative at any time. Thus where I is within the range 0.75A and A, the node BA is connected to the monochromatic input, and the top branch of R-processor in FIG. 18A is operative to apply the maximum voltage $V_{MAX}$ to the R output as shown in FIG. 18A. If I is not within this range, node BA is connected to ground in reference to FIG. 17B. If I is such that $0.5A \leq I < 0.75A$, control signal AB is high or on, thereby connecting 0.5A to the input of the lower branch. The output of this branch is $\alpha$ (I−0.5A) which has the shape of a slanting straight line shown in FIG. 8. Where $0 \leq I < 0.5A$, the inputs of both branches are connected to ground so that the output of the R-processor at node R is "0". The circuits of the G-processor and B-processor in FIGS. 18B, 18C operate in a similar manner to implement the transform functions of FIG. 8. Circuits similar to those shown in FIGS. 17A, 17B, 18A-18C may be designed to implement transform functions other than those illustrated in FIG. 8.

Figures 19, 19A:
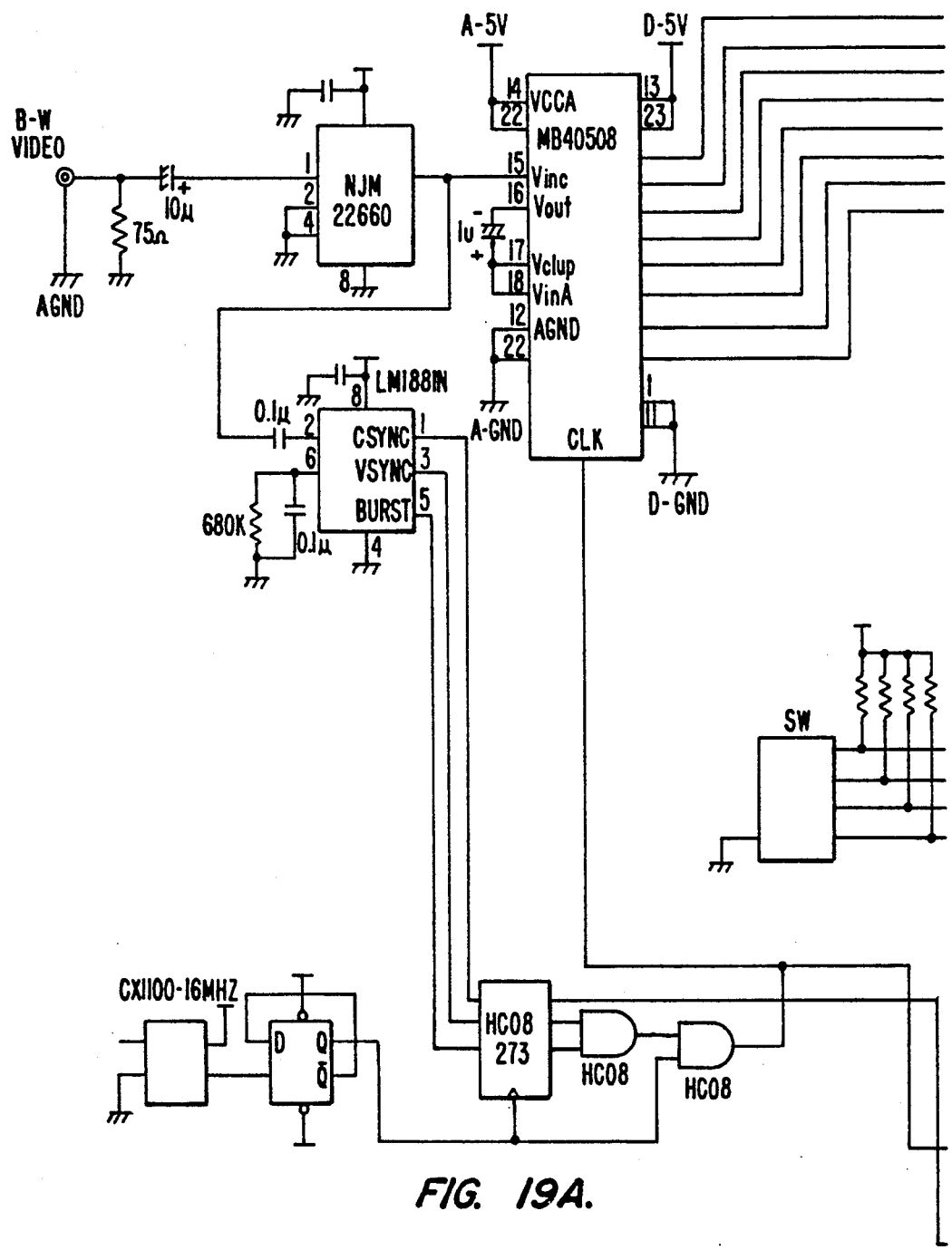
FIG. 19 is a schematic circuit diagram of a detailed implementation of the hybrid analog-digital pseudocolor encoder of FIG. 14.
Figure 19B:
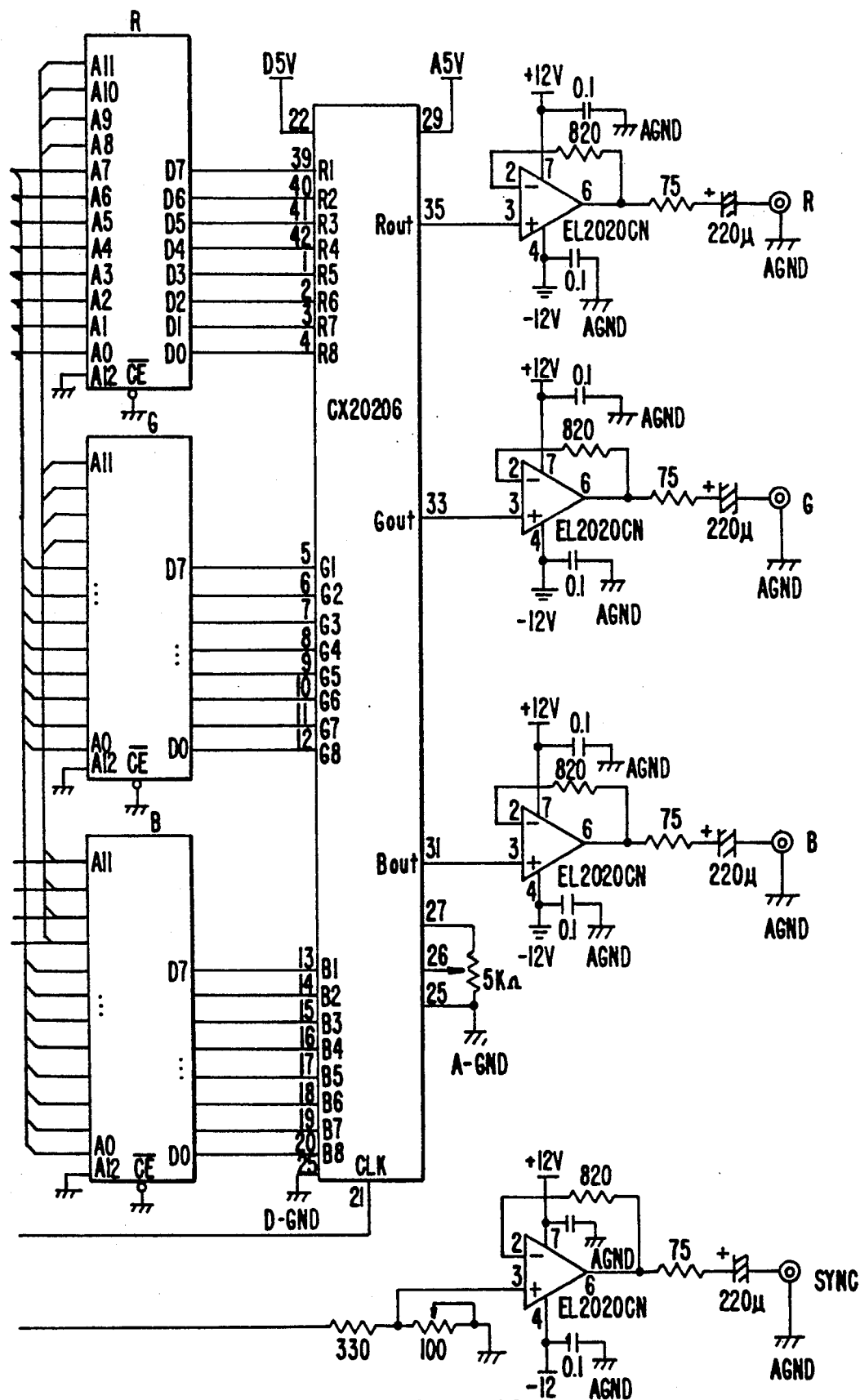

FIG. 19 is a schematic circuit diagram illustrating in more detail the design of the hybrid analog-digital pseudocolor encoder of FIG. 14.

While the invention has been described above by reference to several embodiments, it will be understood that various modifications may be made without departing from the scope of the invention which is limited only by the scope of the appended claims.

What is claimed is:

1. An apparatus for generating a first, second and third pseudocolor video signals from monochromatic video signals having a range of possible amplitudes I between 0 and A, comprising:
    means for generating a first pseudocolor video signal whose amplitude is proportional to that of the monochromatic video signal;
    means for generating a second pseudocolor video signal whose amplitude is proportional to the difference between A and that of the monochromatic video signal; and
    means for multiplying the first and second pseudocolor signals to provide the third pseudocolor video signal.

2. The apparatus of claim said first signal generating means including an unity gain amplifier, said second signal generating means including a differential amplifier, and said multiplying means including a multiplier.

3. The apparatus of claim 1, said first, second and third pseudocolor video signals being suitable for controlling a television monitor for displaying images of the blue, red and green colors respectively.

4. An apparatus for generating a first, second and third pseudocolor video signals from monochromatic video signals having a range of possible amplitudes I between 0 and A, said range comprising n sections, n being a positive integer, and A being a predetermined constant, said apparatus comprising:
    means for generating a first, second and third pseudocolor video signals S1, S2, S3 whose amplitudes are constants or functions of I in each of said n sections, wherein at least the amplitudes of the pseudocolor video signals in one section are not constants and are functions of I that are different from the constant or function in at least one other section, said functions being substantially linear or sinusoidal; and means for outputting said three pseudocolor video signal.

5. The apparatus of claim 4, wherein n is equal to 2 and the generating means is such that the three pseudocolor video signals are given by the equations:

$$S1 = 2(I - 0.5A), \quad I \geq 0.5A,$$
$$= 0, \quad I < 0.5A,$$

$$S2 = 2(A - I), \quad I \geq 0.5A,$$
$$= 2I, \quad I < 0.5A,$$

$$S3 = 0, \quad I \geq 0.5A,$$
$$= 2(0.5A - I), \quad I < 0.5A.$$

6. The apparatus of claim 4, wherein n is equal to 4 and the generating means is such that the three pseudocolor video signals are given by the equations:

$$S1 = 0, \quad 0 \leq I < 0.5A,$$
$$= 4(I - 0.5A), \quad 0.5A \leq I < 0.75A,$$
$$= A, \quad 0.75A \leq I \leq A,$$

$$S2 = 4I, \quad 0 \leq I < 0.25A,$$
$$= A, \quad 0.25A \leq I < 0.75A,$$
$$= 4(A - I), \quad 0.75A \leq I \leq A,$$

$$S3 = A, \quad 0 \leq I < 0.25A,$$
$$= 4(0.5A - I), \quad 0.25A \leq I < 0.5A,$$
$$= 0, \quad 0.5A \leq I \leq A.$$

7. The apparatus of claim 4, wherein n is equal to 7 and the generating means is such that the three pseudocolor video signals are given by the equations:

$$S1 = 7I, \quad 0 \leq I < A/7,$$
$$= 7(2/7A - I), \quad A/7 \leq I < 2A/7,$$
$$= 0, \quad 2A/7 \leq I < 4A/7,$$
$$= 7(I - 4A/7), \quad 4A/7 \leq I < 5A/7,$$
$$= A, \quad 5/7A \leq I \leq A,$$

$$S2 = 0, \quad 0 \leq I < 2A/7,$$
$$= 7(I - 2A/7), \quad 2A/7 \leq I < 3A/7,$$
$$= A, \quad 3A/7 \leq I < 5A/7,$$
$$= 7(6A/7 - I), \quad 5A/7 \leq I < 6A/7,$$
$$= 7(I - 6A/7), \quad 6A/7 \leq I \leq A,$$

$$S3 = 7I, \quad 0 \leq I < A/7,$$
$$= A, \quad A/7 \leq I < 3A/7,$$
$$= 7(4A/7 - I), \quad 3A/7 \leq I < 4A/7,$$
$$= 0, \quad 4A/7 \leq I < 6A/7,$$
$$= 7(I - 6A/7), \quad 6A/7 \leq I \leq A.$$

8. The apparatus of claim 4, wherein n is equal to 7 and the generating means is such that the three pseudocolor video signals are given by the equations:

$$S1 = 7/2\,I, \quad 0 \leq I < A/7,$$
$$= 7/2\,(2A/7 - I), \quad A/7 \leq I < 2A/7,$$
$$= 0, \quad 2A/7 \leq I < 4A/7,$$
$$= 7/2\,(I - 4A/7), \quad 4A/7 \leq I < 6A/7,$$
$$= 14/3\,(15/14A - I), \quad 6A/7 \leq I \leq A,$$

$$S2 = 0, \quad 0 \leq I < 2A/7,$$
$$= 7/2\,(I - 2A/7), \quad 2A/7 \leq I < 4A/7,$$
$$= 7/2\,(6A/7 - I), \quad 4A/7 \leq I < 6A/7,$$
$$= 7/3\,(I - 6A/7), \quad 6A/7 \leq I \leq A,$$

$$S3 = 7/2\,I, \quad 0 \leq I < 2A/7,$$
$$= 7/2\,(4A/7 - I), \quad 2A/7 \leq I < 4A/7,$$
$$= 0, \quad 4A/7 \leq I < 6A/7,$$
$$= 7/3\,(I - 6A/7), \quad 6A/7 \leq I \leq A.$$

9. The apparatus of claim 4, wherein n is equal to 7 and the generating means is such that the three pseudocolor video signals are given by the equations:

$$S1 = A \sin[(7\pi/2A)\,I], \quad 0 \leq I < 2A/7,$$
$$= 0, \quad 2A/7 \leq I < 4A/7,$$
$$= A \sin[(7\pi/2A)\,I], \quad 4A/7 \leq I < 5A/7,$$
$$= A, \quad 5A/7 \leq I \leq A,$$

$$S2 = 0, \quad 0 \leq I < 2A/7,$$
$$= A \sin[(7\pi/2A)(I - 2A/7)], \quad 2A/7 \leq I < 3A/7,$$
$$= A, \quad 3A/7 \leq I < 5A/7,$$
$$= A \sin[(7\pi/2A)\,I], \quad 5A/7 \leq I < 6A/7,$$
$$= A \sin[(7\pi/2A)(I - 2A/7)], \quad 6A/7 \leq I < A,$$

$$S3 = A \sin[(7\pi/2A)\,I], \quad 0 \leq I < A/7,$$
$$= A, \quad A/7 \leq I < 3A/7,$$
$$= A \sin[(7\pi/2A)(I - 2A/7)], \quad 3A/7 \leq I < 4A/7,$$
$$= 0, \quad 4A/7 \leq I < 6A/7,$$
$$= A \sin[(7\pi/2A)(I - 2A/7)], \quad 6A/7 \leq I < A.$$

10. The apparatus of claim 4, wherein n is a positive integer less than eight.

11. The apparatus of claim 4, wherein said generating means consists of analog circuits.

12. The apparatus of claim 4, wherein said generating means comprises hybrid analog-digital circuits.

13. A method for generating a first, second and third pseudocolor video signals from monochromatic video signals having a range of possible amplitudes I between 0 and A, comprising:

generating a first pseudocolor video signal whose amplitude is proportional to that of the monochromatic video signal;

generating a second pseudocolor video signal whose amplitude is proportional to the difference between A and that of the monochromatic video signal; and multiplying the first and second pseudocolor signals to provide the third pseudocolor video signal.

14. A method for generating a first, second and third pseudocolor video signals from monochromatic video signals having amplitudes I in a range between 0 and A, A being a predetermined constant, said range comprising n sections, n being a positive integer, said method comprising:

generating a first, second and third pseudocolor video signal S1, S2, S3 whose amplitudes are constants or functions of A in each of said n sections, wherein at least the amplitudes of the pseudocolor video signals in one section are not constants and are functions of I that are different from the constant or function in at least one other section, said functions being substantially linear or sinusoidal; and applying said three pseudocolor video signals to a display device in order to display color images according to the three pseudocolor video signals.

15. The method of claim 14, wherein n is equal to 2 and the generating means is such that the three pseudocolor video signals are given by the equations:

$$S1 = 2(I - 0.5A), \quad I \geq 0.5A,$$
$$= 0, \quad I < 0.5A,$$

$$S2 = 2(A - I), \quad I \geq 0.5A,$$
$$= 2I, \quad I < 0.5A,$$

$$S3 = 0, \quad I \geq 0.5A,$$
$$= 2(0.5A - I), \quad I < 0.5A.$$

16. The method of claim 14, wherein n is equal to 4 and the generating means is such that the three pseudocolor video signals are given by the equations:

$$S1 = 0, \quad 0 \leq I < 0.5A,$$
$$= 4(I - 0.5A), \quad 0.5A \leq I < 0.75A,$$
$$= A, \quad 0.75A \leq I \leq A,$$

$$S2 = 4I, \quad 0 \leq I < 0.25A,$$
$$= A, \quad 0.25A \leq I < 0.75A,$$
$$= 4(A - I), \quad 0.75A \leq I \leq A,$$

$$S3 = A, \quad 0 \leq I < 0.25A,$$
$$= 4(0.5A - I), \quad 0.25A \leq I < 0.5A,$$
$$= 0, \quad 0.5A \leq I \leq A.$$

17. The method of claim 14, wherein n is equal to 7 and the generating means is such that the three pseudocolor video signals are given by the equations:

$$S1 = 7I, \quad 0 \leq I < A/7,$$
$$= 7(2A/7 - I), \quad A/7 \leq I < 2A/7,$$
$$= 0, \quad 2A/7 \leq I < 4A/7,$$
$$= 7(I - 4A/7), \quad 4A/7 \leq I < 5A/7,$$
$$= A, \quad 5/7A \leq I \leq A,$$

$$S2 = 0, \quad 0 \leq I < 2A/7,$$
$$= 7(I - 2A/7), \quad 2A/7 \leq I < 3A/7,$$
$$= A, \quad 3A/7 \leq I < 5A/7,$$
$$= 7(6A/7 - I), \quad 5A/7 \leq I < 6A/7,$$
$$= 7(I - 6A/7), \quad 6A/7 \leq I \leq A,$$

$$S3 = 7I, \quad 0 \leq I < A/7,$$
$$= A, \quad A/7 \leq I < 3A/7,$$
$$= 7(4A/7 - I), \quad 3A/7 \leq I < 4A/7,$$
$$= 0, \quad 4A/7 \leq I < 6A/7,$$
$$= 7(I - 6A/7), \quad 6A/7 \leq I \leq A.$$

18. The method of claim 14, wherein n is equal to 7 and the generating means is such that the three pseudocolor video signals are given by the equations:

$$S1 = 7/2 \, I, \quad 0 \leq I < A/7,$$
$$= 7/2 (2A/7 - I), \quad A/7 \leq I < 2A/7,$$
$$= 0, \quad 2A/7 \leq I < 4A/7,$$
$$= 7/2 (I - 4A/7), \quad 4A/7 \leq I < 6A/7,$$
$$= 14/3 (15/14A - I), \quad 6A/7 \leq I \leq A,$$

$$S2 = 0, \quad 0 \leq I < 2A/7,$$
$$= 7/2 (I - 2A/7), \quad 2A/7 \leq I < 4A/7,$$
$$= 7/2 (6A/7 - I), \quad 4A/7 \leq I < 6A/7,$$
$$= 7/3 (I - 6A/7), \quad 6A/7 \leq I \leq A,$$

$$S3 = 7/2 \, I, \quad 0 \leq I < 2A/7,$$
$$= 7/2 (4A/7 - I), \quad 2A/7 \leq I < 4A/7,$$
$$= 0, \quad 4A/7 \leq I < 6A/7,$$
$$= 7/3 (I - 6A/7), \quad 6A/7 \leq I \leq A.$$

19. The method of claim 14, wherein n is equal to 7 and the generating means is such that the three pseudocolor video signals are given by the equations:

$$S1 = A \sin[(7\pi/2A) I], \quad 0 \leq I < 2A/7,$$
$$= 0, \quad 2A/7 \leq I < 4A/7,$$
$$= A \sin[(7\pi/2A) I], \quad 4A/7 \leq I < 5A/7,$$
$$= A, \quad 5A/7 \leq I \leq A,$$

$$S2 = 0, \quad 0 \leq I < 2A/7,$$
$$= A \sin[(7\pi/2A)(I - 2A/7)], \quad 2A/7 \leq I < 3A/7,$$
$$= A, \quad 3A/7 \leq I < 5A/7,$$
$$= A \sin[(7\pi/2A) I], \quad 5A/7 \leq I < 6A/7,$$
$$= A \sin[(7\pi/2A)(I - 2A/7)], \quad 6A/7 \leq I < A,$$

$$S3 = A \sin[(7\pi/2A) I], \quad 0 \leq I < A/7,$$
$$= A, \quad A/7 \leq I < 3A/7,$$
$$= A \sin[(7\pi/2A)(I - 2A/7)], \quad 3A/7 \leq I < 4A/7,$$
$$= 0, \quad 4A/7 \leq I < 6A/7,$$
$$= A \sin[(7\pi/2A)(I - 2A/7)], \quad 6A/7 \leq I < A.$$

20. A portable system for providing pseudocolor images of objects, comprising:
- a monochromatic television camera for providing monochromatic video signals in response to objects;
- a pseudocolor encoder for generating a first, second and third pseudocolor video signal in response to said monochromatic video signals in real time;
- color monitor means responsive to said three pseudocolor video signals for displaying pseudocolor images of said objects; and
- a housing for holding the camera, the encoder and the monitor means wherein said first, second and third pseudocolor video signals generated by the encoder have amplitudes that are constants or functions of the amplitude of the monochromatic video signals, said functions being substantially linear or sinusoidal.

* * * * *

UNITED STATES PATENT AND TRADEMARK OFFICE
CERTIFICATE OF CORRECTION

PATENT NO. : 5,182,639
DATED : January 26, 1993
INVENTOR(S) : Jutamulia et al.

It is certified that error appears in the above-indentified patent and that said Letters Patent is hereby corrected as shown below:

Column 12, line 46, in claim 2      Insert --1,-- after "claim"

Signed and Sealed this

Fourteenth Day of December, 1993

Attest:

BRUCE LEHMAN

Attesting Officer     Commissioner of Patents and Trademarks